(12) United States Patent
Garg et al.

(10) Patent No.: US 10,783,194 B1
(45) Date of Patent: Sep. 22, 2020

(54) PROVIDING REMEDIAL SEARCH OPERATION BASED ON ANALYSIS OF USER INTERACTION WITH SEARCH RESULTS

(71) Applicant: Google LLC, Mountain View, CA (US)

(72) Inventors: Ashutosh Garg, Sunnyvale, CA (US);
Kedar Dhamdhere, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 305 days.

(21) Appl. No.: 15/886,510

(22) Filed: Feb. 1, 2018

Related U.S. Application Data

(63) Continuation of application No. 14/538,120, filed on Nov. 11, 2014, now Pat. No. 9,922,122, which is a continuation of application No. 13/616,026, filed on Sep. 14, 2012, now Pat. No. 8,892,589, which is a continuation of application No. 12/696,321, filed on Jan. 29, 2010, now Pat. No. 8,316,037.

(60) Provisional application No. 61/148,654, filed on Jan. 30, 2009.

(51) Int. Cl.
*G06F 16/951* (2019.01)
*G06F 16/9535* (2019.01)

(52) U.S. Cl.
CPC ........ *G06F 16/951* (2019.01); *G06F 16/9535* (2019.01)

(58) Field of Classification Search
CPC ............................ G06F 16/951; G06F 16/9535
See application file for complete search history.

(56) References Cited

U.S. PATENT DOCUMENTS

| | | | |
|---|---|---|---|
| 6,078,917 A * | 6/2000 | Paulsen, Jr. | G06F 16/3346 |
| 7,801,885 B1 | 9/2010 | Verma | |
| 7,953,730 B1 * | 5/2011 | Bleckner | G06F 16/951 |
| | | | 707/722 |
| 2006/0036565 A1 | 2/2006 | Bruecken | |
| 2006/0161534 A1 * | 7/2006 | Carson, Jr. | G06F 16/951 |
| 2006/0167842 A1 | 7/2006 | Watson | |
| 2006/0259861 A1 | 11/2006 | Watson | |
| 2007/0088685 A1 | 4/2007 | Wilson et al. | |
| 2007/0100804 A1 | 5/2007 | Cava | |
| 2007/0112759 A1 | 5/2007 | Kulakow et al. | |
| 2007/0136251 A1 | 6/2007 | Colledge et al. | |
| 2007/0174273 A1 | 7/2007 | Jones | |
| 2007/0294615 A1 | 12/2007 | Sathe | |
| 2008/0162537 A1 | 7/2008 | Mancini | |
| 2008/0177717 A1 | 7/2008 | Kumar et al. | |
| 2008/0235187 A1 | 9/2008 | Gade | |

(Continued)

*Primary Examiner* — Jay A Morrison
(74) *Attorney, Agent, or Firm* — Fish & Richardson P.C.

(57) ABSTRACT

Methods, systems, and apparatus, including computer program products, for assisting users in performing searches. In one aspect, a query for a search session is received from a user device. A first set of search results responsive to the query is provided to the user device. Search results interaction data are received from the user device that identifies actions that are in response to the search results and taken at the user device. The search results interaction data are analyzed to determine that a remedial search operation should be performed, the remedial search operation determining a second set of search results responsive to the query and providing the second set of search results to the user device for presentation to the user.

17 Claims, 8 Drawing Sheets

(56) References Cited

U.S. PATENT DOCUMENTS

| | | |
|---|---|---|
| 2009/0077037 A1 | 3/2009 | Wu |
| 2009/0187515 A1 | 7/2009 | Andrew |
| 2009/0282022 A1 | 11/2009 | Bennett |
| 2010/0082610 A1* | 4/2010 | Anick .................. G06F 16/951 707/723 |
| 2010/0114908 A1* | 5/2010 | Chand .................. G06F 16/951 707/748 |

\* cited by examiner

PROVIDING REMEDIAL SEARCH OPERATION BASED ON ANALYSIS OF USER INTERACTION WITH SEARCH RESULTS

CROSS-REFERENCE TO RELATED APPLICATIONS

This application is a continuation application of, and claims priority to, U.S. patent application Ser. No. 14/538,120, filed on Nov. 11, 2014, titled "Providing Remedial Search Operation Based On Analysis Of User Interaction With Search Results," which is a continuation application of U.S. patent application Ser. No. 13/616,026, filed on Sep. 14, 2012, now U.S. Pat. No. 8,892,589, titled "Providing Remedial Search Operation Based On Analysis Of User Interaction With Search Results," which is a continuation of U.S. patent application Ser. No. 12/696,321, filed on Jan. 29, 2010, now U.S. Pat. No. 8,316,037, titled "Providing Remedial Search Operation Based On Analysis Of User Interaction With Search Results," which claims the benefit under 35 U.S.C. § 119(e) of U.S. Patent Application No. 61/148,654, filed on Jan. 30, 2009, titled "Providing Remedial Search Operations Based on Analysis of User Interaction with Search Results". The disclosure of each of these applications is incorporated herein by reference in their entirety.

BACKGROUND

This specification is related to search processing.

Internet users rely on search engines to locate information on the Internet. Typically, a user formulates a query relating to the information that the user is looking for and submits the query to a search engine. The search engine then provides to the user a web page (which is generally the first of multiple web pages) that includes multiple search results that the search engine has determined are responsive to the query. Each search result identifies an Internet-addressable resource and a link to the resource, and generally provides some information about the resource. The user will then generally use the links to get the resources in an attempt to find the information that the user is looking for.

If the search results do not provide material that the user deems satisfactory, the user may reformulate the query to receive a different set of search results from the search engine. If the user is still not satisfied with the search results, the user will continue to submit additional queries until he or she is satisfied with the search results or will give up and stop submitting queries to the search engine.

SUMMARY

In general, one aspect of the subject matter described in this specification can be embodied in a method in which a query in a search session is received from a user device. A first set of search results responsive to the query is provided to the user device. Search results interaction data that identify one or more additional queries submitted from the user device in response to the search results are received. The search results interaction data are analyzed to determine that a remedial search operation should be performed, the remedial search operation determining that one or more of the identified one or more queries submitted from the user device have a related query and providing the related query to the user device for presentation to the user. Other embodiments of this aspect include corresponding systems, apparatus, and computer program products, recorded on computer-readable storage devices, each configured to perform the operations of the methods.

These and other embodiments can each optionally include one or more of the following features: Analyzing the search results interaction data may include determining that the remedial search operation should be performed if the user submitted a number of related queries greater than a threshold number of queries. Analyzing the search results interaction data may include determining that the remedial search operation should be performed if the user submitted a number of queries greater than a threshold number of queries and short-clicks are provided in response to search results provided for each query.

In general, one aspect of the subject matter described in this specification can be embodied in a method in which a query in a search session is received from a user device. A first set of search results responsive to the query is provided to the user device. Search results interaction data that identify actions that are in response to the search results and taken at the user device are received. The search results interaction data are analyzed to determine that a remedial search operation should be performed, the remedial search operation providing a request for information about the query to the user device and receiving information about the query from the user device in response to the request. Other embodiments of this aspect include corresponding systems, apparatus, and computer program products, recorded on computer readable storage devices, each configured to perform the operations of the methods.

These and other embodiments can each optionally include one or more of the following features: The remedial search operation may include the operation of presenting the received information about the query to a search specialist. The received information about the query may be posted to a blog, message board, or a discussion forum.

In general, one aspect of the subject matter described in this specification can be embodied in a method in which a query in a search session is received from a user device. A first set of search results responsive to the query is provided to the user device. Search results interaction data that identify actions that are in response to the search results and taken at the user device are received. The search results interaction data are analyzed to determine that a remedial search operation should be performed, the remedial search operation determining a second set of search results responsive to the query and providing the second set of search results to the user device for presentation to the user. Other embodiments of this aspect include corresponding systems, apparatus, and computer program products, recorded on computer readable storage devices, each configured to perform the operations of the methods.

These and other embodiments can each optionally include one or more of the following features: Analyzing the search results interaction data may include determining that the remedial search operation should be performed if the user submitted a number of related queries greater than a threshold number of queries. Analyzing the search results interaction data may include determining that the remedial search operation should be performed if the user submitted a number of queries greater than a threshold number of queries and short clicks are provided in response to search results provided for each query.

Particular embodiments of the subject matter described in this specification can be implemented so as to realize one or more of the following advantages. A determination is made of whether remedial search operations are necessary based on observed user behavior with respect to search results provided to the user. A determination is made of which remedial search operation to perform based on search results interaction data received during a search session. User feedback can be received that can be used to improve the quality of search results in the future.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
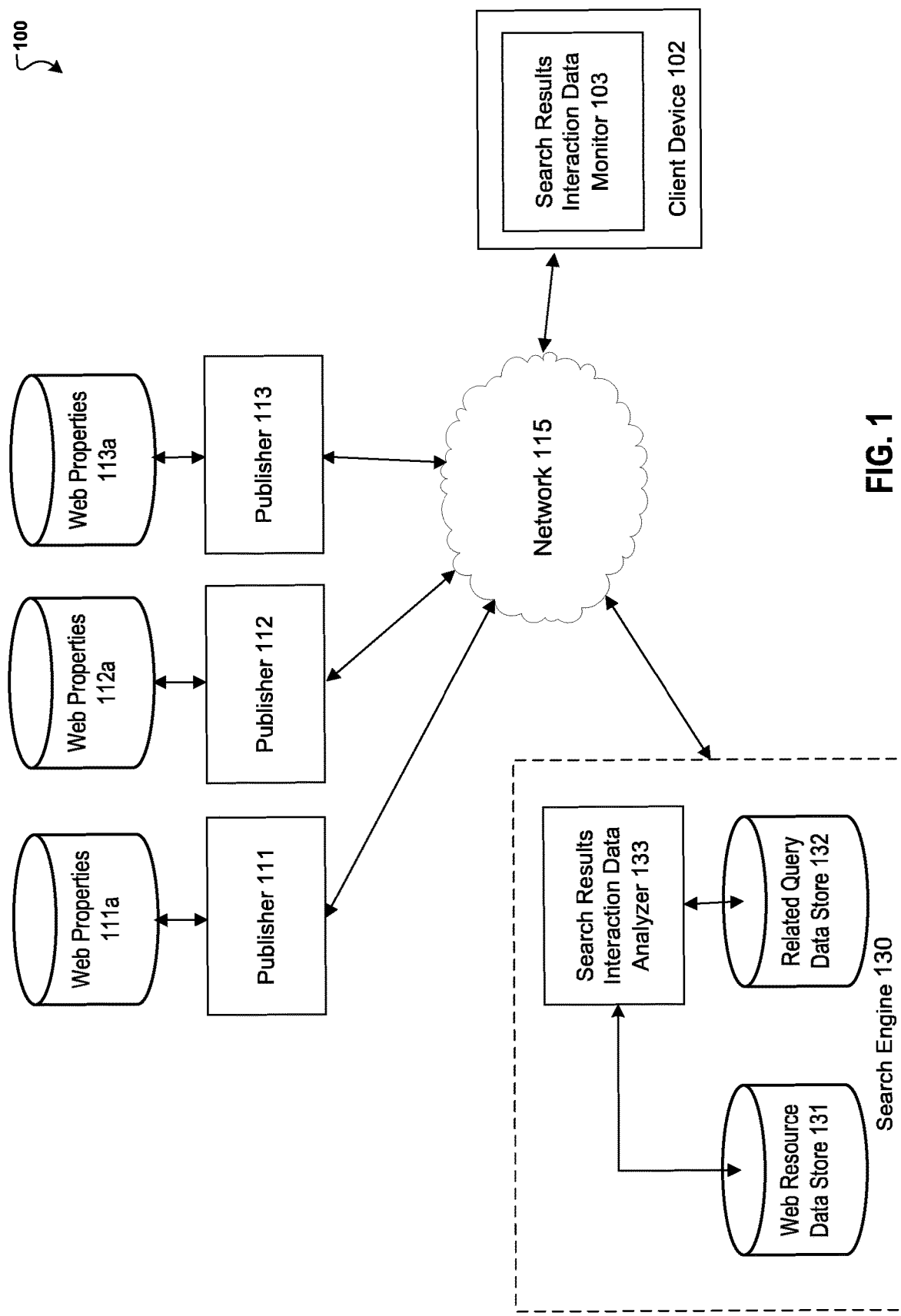
FIG. 1 is an illustration of an example environment in which remedial search operations can be provided.

FIG. 1 is an illustration of an example environment in which remedial search operations can be provided. The environment 100 includes publishers 111-113, a user device 102, and a search engine 130. The publishers 111-113 can include general content servers that store and receive requests for web resources (e.g., web resources 111a, 112a, and 113a), and provide the requested web resources in response to the requests. Web resources can include web pages, articles, discussion threads, music, video, search results, web page listings, and information feeds, for example. Content servers, related news content providers, retailers, blogs, social network sites, or any other entity that provides web resources over the network 115 can be a publisher. The network 115 can include a variety of public and private networks such as a public-switched telephone network, a cellular telephone network, and/or the Internet, for example.

The search engine 130 receives queries from client devices (e.g., client device 102), identifies web resources responsive to the queries, and provides a list of the web resources responsive to the queries to the client devices. In some implementations, the search engine 130 can store web resource data related to the web resources available from the publishers 111-113 in a web resource data store 131. The web resource data can include context information such as keywords and text from each of the web resources in the form of a search index, for example. When a query is received by the search engine 130, the web resource data store 131 can be used by the search engine 130 to identify web resources from the publishers 111-113 that are responsive to the query.

The search engine 130 can further include a related query data store 132. The related query data store 132 can store related query data for one or more queries. In some implementations, the related query data can include additional queries related to a subject or topic of a query. For example, the queries Uruguay and Panama can have related query data identifying the query South America. Such topic related queries can be identified from preexisting topic clusters, such as queries related to the topics finance, automobiles, and the like. Such preexisting topic clusters can be generated, for example, by comparing queries to topic descriptions and hierarchies that are available from a variety of sources, such as topic descriptions and hierarchies from an open directory project, available to third parties, or from other directories, such as the Google™ directory. Based on the comparison, similar queries can be arranged by topics.

In some implementations, the related queries are identified from queries previously submitted to the search engine 130 during other search sessions by many other users. Data mining techniques can be used to identify the related queries submitted during previous search sessions. As users often input queries that are related, e.g., Fourth of July/Independence Day, the proximity of such queries in search sessions occurring with statistical significance can be used by the system as an indication of query relatedness.

The related query data can further identify common misspellings for queries (e.g., receive/recieve), homophones (e.g., to/too/two), and synonyms (e.g., Fourth of July/Independence Day). Such related queries can be identified by use of many available language models.

In other implementations, the related queries can be provided from an external system or data store.

A client device 102 can send a query to the search engine 130 during a search session and receive a set of search results in response. The search results can include a list or set of links identifying one or more web resources responsive to the query. A user at the client device 102 can select a link to view the identified web resource.

In some implementations, a search session is defined by a period of time between queries. For example, if the user device 102 submits a query, a current search session can be initiated. The current search session can be terminated when the search engine 130 has not received further queries from the user for a preset period of time (e.g., 5-10 minutes). In other implementations, the search session is defined by a user indicating the beginning and end of a search session (e.g., by logging into a search engine interface of the search engine 130 and logging out of a search engine interface). In still other implementations, the search session is defined by a relationship between a newly received search query and previously received search queries from the same user (e.g., where the previously received search query in a search session is related to digital cameras, if the newly received search query is related to a new topic other than digital cameras, a current search session is terminated and a new search session is initiated). In some implementations, more than one aspect of the user interaction is used to determine when a search session begins and ends.

In some implementations, the search engine 130 collects search results interaction data from the user device 102 during the search session. The search results interaction data are data that identify actions taken by the user when interacting with the search results. In some implementations, the search results interaction data may identify search result selection actions, additional user generated query input actions and search result page request actions taken at the user device 102. The search results interaction data are analyzed to measure a signal of user satisfaction, e.g., a signal indicative of whether a user of the user device 102 is satisfied with the provided search results, and to determine whether one or more remedial search operations should be performed. A remedial search operation is a search related operation that is performed by the search engine in response to the search engine detecting a pre-defined pattern of user interactions with the search results and without the user requesting the search related operation.

The search engine 130 can include a search results interaction data analyzer 133 that receives and interprets the search results interaction data to detect pre-defined patterns of user interactions. Example search results interaction data can include data indicating additional queries submitted by the user during the search session; the search results that the user selected; and whether the user dwelled on a particular web resource for a long or short period of time (i.e., did the user make a short click or a long click), to name just a few.

Long clicks occur when a user views a web resource identified by a search result for a length of time above a set threshold value; clicks through the search result without returning to the search session; or views other web resources linked from the search result landing page. Likewise, short click occurs when a user views a web resource search result for a short period of time and then causes the user device 102 to revert back to the search results.

The submission of queries and resulting clicks and click types constitute search results interaction data and can be used to determine a signal of user satisfaction. A pattern of long clicks in various scenarios can be indicative of a high level of user satisfaction. For example, data indicating that a user is making a long click on one of the provided search results is a signal that the user is satisfied with the provided search result.

Another scenario is a long click followed by a related query. After submitting a first query, a user may make a long click on one of the responsive search results and then submits a second query that is related to the user's first query to the search engine. In this scenario, the user is likely satisfied with the web resource identified by the search result, and may be trying to refine the search based on information learned while viewing the web resource.

Another scenario is when a user makes a long click on several of the provided search results and then submits a related query. Here again, these actions can be interpreted as a signal that the user is likely satisfied with the search results and may now be trying to refine the search based on information learned while viewing the web resources identified by the selected search results.

When the pattern of user interactions signals indicates that the user is not satisfied with the search results, the search engine 130 can perform a remedial search operation. Example search results interaction data that can be interpreted as a signal of a low level of user satisfaction can include data indicating a pattern of submitting several topic-related queries with no clicks on a search results or several short clicks; data indicating a pattern of requesting of several pages of search results for a query without selecting a search result; or data indicating a pattern of submitting of a number of queries, related or unrelated, exceeding a threshold number with no clicks on a search result or several short clicks.

The search result interaction data analyzer 133 receives the search results interaction data from the client device 102 and analyzes the received search results interaction data to determine if a remedial search operation should be performed for the user.

One example remedial search operation is the search results interaction data analyzer 133 presenting to the user a query suggestion. The query suggestion may include queries related to queries submitted by the user during the search session. For example, the search results interaction data analyzer 133 can determine if one or more of the queries submitted during the search session has one or more related queries as indicated by the related query data in the related query data store 132. Related queries for remedial search operations can include queries that belong to a similar topic, for example.

For example, a user submits several queries, such as finance, value investing, low price to earning investing, and selects only several search results from among all the search results provided. Further, the selection of each search result is followed by an immediate reversion back to the search results page, and thus all of the selections are short clicks. As a result, the search results interaction data analyzer 133 can interpret the search results interaction data as evidencing a strong signal of user dissatisfaction. Accordingly, the search results interaction data analyzer 133 can identify another query that is closely related to the queries of finance, value investing, and low price to earning investing, such as contrarian investing. The search engine 130 can, in turn, suggest this related query to the user. In some implementations, the related queries can be presented to the user as links that when selected will cause the associated related query to be submitted to the search engine 130.

The related query data may also include common misspellings of query terms, or synonyms or homonyms of query terms. For example, a user may have submitted the query Washington Capital looking for information related to the Capitol Building in Washington, D.C., and subsequently selects only several search results from among all the search results provided. Furthermore, the selections of each search result is followed by an immediate reversion back to the search results page because the user realizes the that the result is related to Olympia, Wash. rather than the Capitol Building. As a result, the search result data analyzer 133 can interpret the search results interaction data as evidencing a strong signal of user dissatisfaction. Accordingly, the user interaction signal analyzer 133 can identify another query—Capitol Building—that is related to the query Washington Capital in the related query data. The search engine 130 can, in turn, suggest this related query to the user.

Another example remedial search operation is the search results interaction data analyzer 133 presenting suggested queries based on one or more common keywords associated with web resources viewed during the search session. In some implementations, the keywords for each of the web resources viewed during the search session can be identified by the search results interaction data analyzer 133 using the web resource data associated with the identified web resources in the web resource data store 131, for example. The keywords can include individual words and phrases. Many keyword identification techniques can be used, including the analysis of titles, metadata and descriptions, and content of the landing pages of the search results. In some implementations, the keywords can be limited to keywords related to the user queries. The common keywords can then be presented to the user as links that when selected will cause the selected keyword to be submitted to the search engine 130 as a query, for example.

Another example remedial search operation is presenting the user a larger number of search results than were initially presented during the search session. For example, if the search engine 130 provided ten search results per search results page, then the search results interaction data analyzer 133 can instruct the search engine 130 to provide additional search results to the user (e.g., twenty search results).

In some implementations, this search results interaction data analyzer 133 can suggest to the user that the user increase the default number of search results specified by user preferences. For example, as part of the remedial search operations, the search results interaction data analyzer 133 can present the user with a link to a web resource where the user can increase the default number of search results received by the user from the search engine 130. After the user changes the number of search results, the initial query can be resubmitted to the search engine 130 and a new set of search results having the increased number of results can be presented to the user, for example.

Another example remedial search operation is for the search results interaction data analyzer 133 to adjust search preferences associated with a user. For example, search preferences may be changed to limit search results to a specific language (or expand search results to all languages), to change the search interface language, to adjust filtering options for objectionable material, and to open a web resource identified by a search result in a new browser window.

Another example remedial search operation is the search results interaction data analyzer 133 requesting additional information from the user about the initial or subsequent query. For example, the request for additional information can include displaying text asking the user to describe what information they are trying to find with the query or queries submitted during the search session, and a text box where the user can enter their response. In some implementations, the entered response can be posted on a message board, blog, or other forum. Users of the forum can then make suggestions for queries that can help the user locate the desired information. The suggestions can be provided to the user, for example, by email, or at a later time when the user initiates another search session with the search engine 130.

In other implementations, the response can be provided to one or more query specialists. The specialists can provide the user with a new suggested query, or can further communicate with the user using a chat or instant message application. A chat application can be part of a toolbar implemented at the client device 102, for example.

In other implementations, the response can be evaluated by the search engine 130 for additional related keywords. For example, common stop words can be ignored and the remaining words can be used as additional search terms.

Other remedial search operations can also be implemented. Additionally, in some implementations, remedial search operations are performed sequentially. For example, if the search results interaction data analyzer 133 determines that a remedial search operation should be performed, a first remedial search operation for a query suggestion can be made. Thereafter, if the search results interaction data analyzer 133 determines that another remedial search operation should be performed, such as in the case of the user continuing to provide short clicks in response to search results from the first remedial search operation, a second remedial search operation can change one or more search preferences. Thereafter, if the search results interaction data analyzer 133 determines that another remedial search operation should be performed, then a third remedial search operation can be a request to the user for additional information about the initial or subsequent query. In other implementations, multiple remedial search operations can be performed in parallel.

Figure 2:
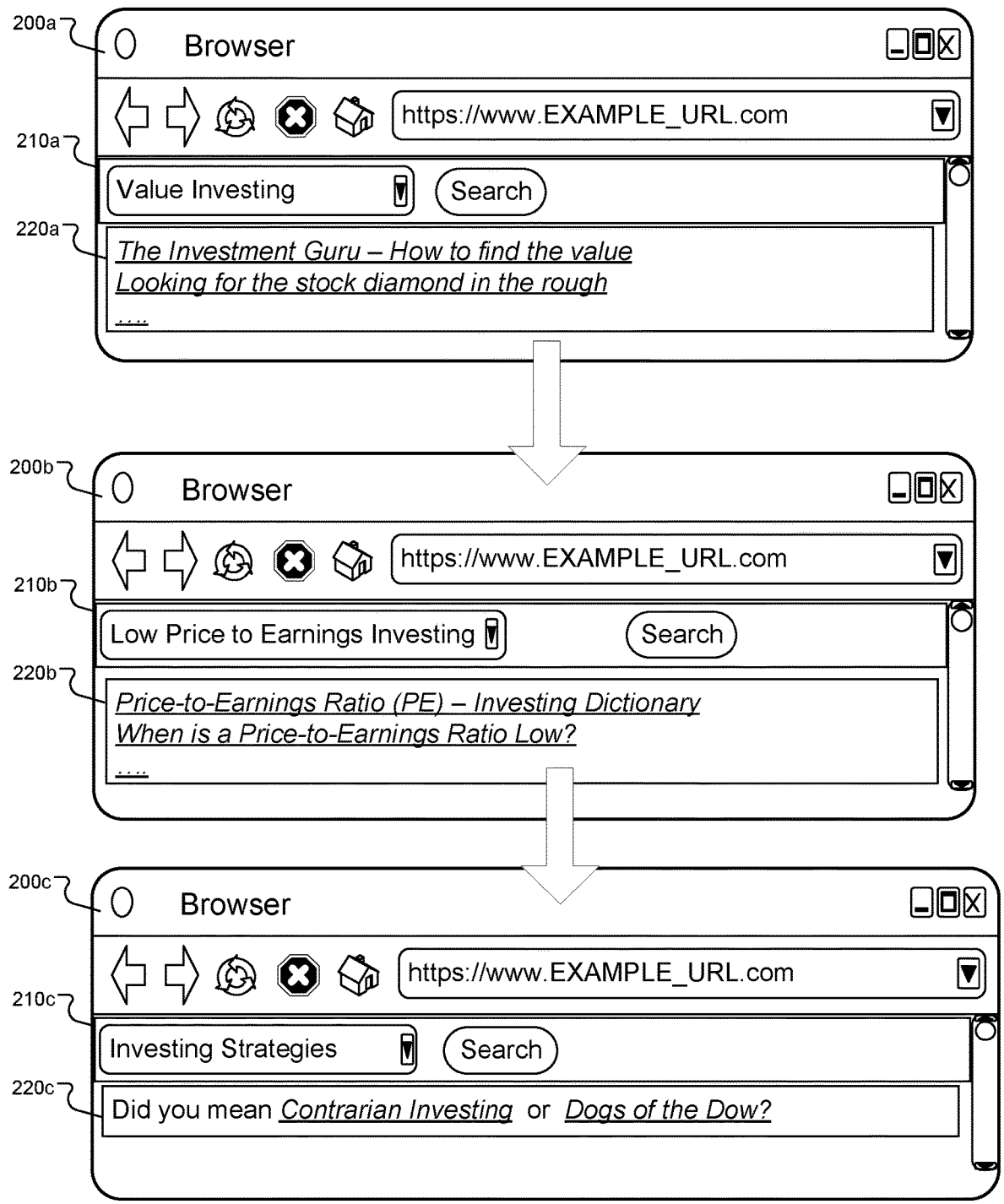
FIGS. 2-4 are illustrations of example user interfaces.

FIG. 2 is an illustration of example user interfaces 200a, 200b, and 200c. The user interfaces can be implemented on a client device 102, for example.

As shown in user interface 200a, a user has entered the query Value Investing into a query entry field 210a. The entered query can have been provided to a search engine (e.g., search engine 130), and the received search results are displayed in a search results display 220a, for example. As illustrated, the search results display 220a includes links to web resources responsive to the query Value Investing, the first two of which are shown.

After submitting the query, or alternatively, after receiving the search results, search results interaction data can be collected regarding the Value Investing query during the search session.

As shown in user interface 200b, the user has entered and submitted a new query, Low Price to Earnings Investing into the query entry field 210b. The user may have not been satisfied with the results presented in the search results display 220a for Value Investing and decided to try the query Low Price to Earning Investing. The lack of user satisfaction can be interpreted by, for example, search results interaction data indicating that only short clicks or no clicks were provided in response to the search results 220a. Accordingly, links to the web resources responsive to the query Low Price to Earning Investing are displayed in the search results display 220b.

Thereafter, the search results interaction data analyzer 133 can determine if one or more remedial search operations should be performed. In the example shown, the search results interaction data analyzer 133 has determined that the user is not satisfied with the search results 220a and 220b and has provided a remedial search operation in the user interface 200c. This determination can be made on the detection of one or more pre-defined patterns, for example, if the user made more than a threshold number of short clicks on either of the search results presented in 220a or 220b, made more than a threshold number of clicks during the search session, made no further clicks after some threshold number of queries were submitted, made more than a threshold number of queries during the search session, or the search session has exceeded some threshold amount of time without receiving a long click.

In particular, the search results interaction data analyzer 133 has determined that the queries Value Investing and Low Price to Earning Investing are related to the identified queries Contrarian Investing and Dogs of the Dow, and has presented these identified queries in the query display window 220c as a query suggestion. In some implementations, the search results interaction data analyzer 133 can have determined the related queries by comparing the two queries to the related query data in the related query data store 132, for example.

Figure 3:
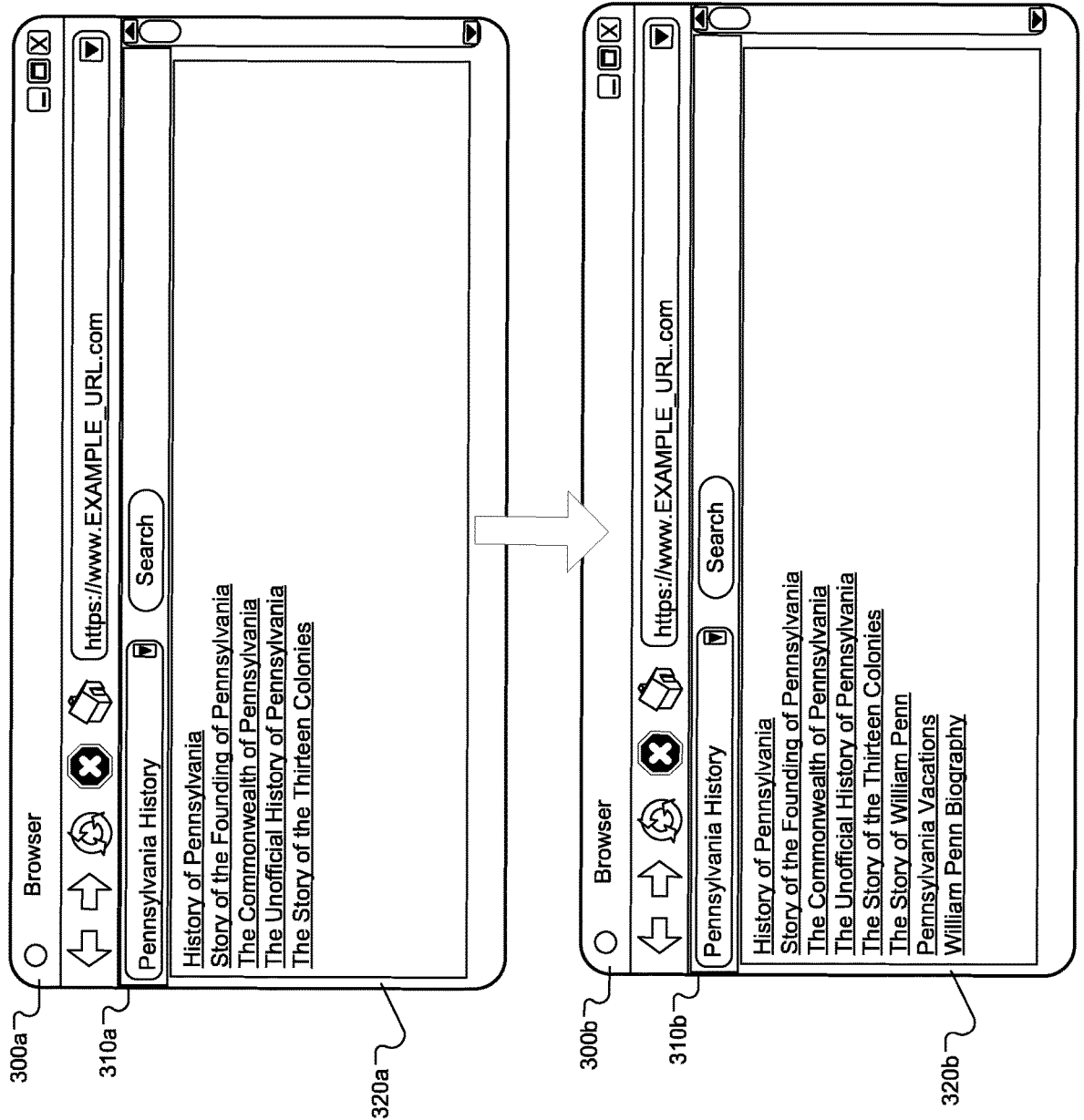

FIG. 3 is an illustration of example user interfaces 300a and 300b for a search engine to use in conducting a search session and providing the results of a remedial search operation. The user interfaces can be implemented on a client device 102, for example.

As shown in user interface 300a, a user has entered the query Pennsylvania History into a query entry field 310a. The entered query may have been provided to a search engine (e.g., search engine 130), and the received search results are displayed in a search results display 320a, for example. As illustrated, the search results display 320a includes five links to web resources responsive to the query Pennsylvania History, in accordance with a preference setting of presenting five search results per search results page.

During the search session search results interaction data are collected regarding the Pennsylvania History query. The collected search results interaction data can include additional queries that the user has submitted after submitting the query Pennsylvania History, for example.

Thereafter, the search results interaction data analyzer 133 can determine if one or more remedial search operations should be performed. In the example shown, the search results interaction data analyzer 133 has determined that the user is not satisfied with the research results and has provided the results of a remedial search operation in the user interface 300*b*. For example, the user may have made more than a threshold number of short clicks. In the example shown in the user interface 300*b*, the search results interaction data analyzer 133 has performed the remedial search operation of increasing the number of search results presented to the user from five to ten.

Figure 4:
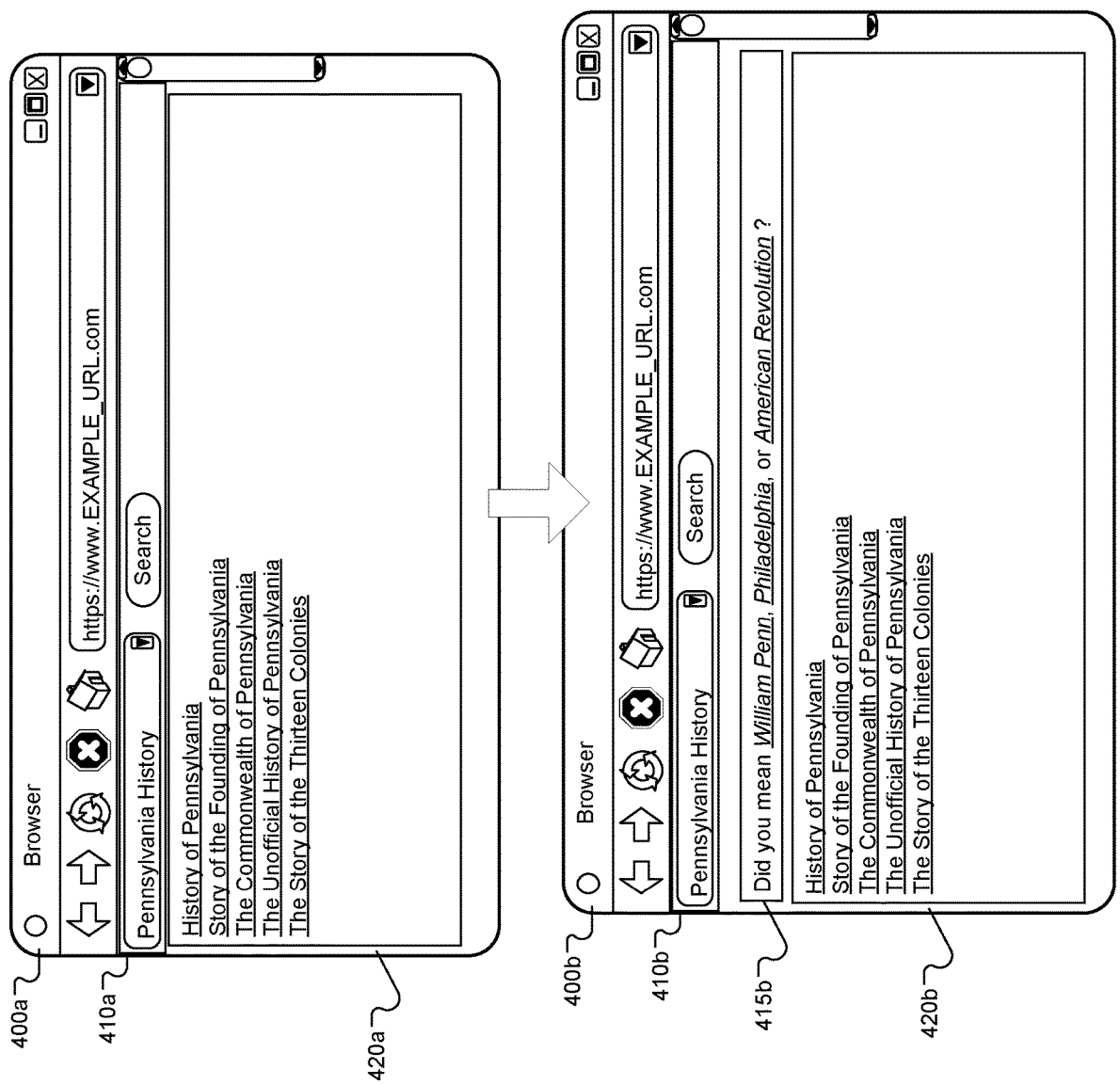

FIG. 4 is an illustration of example user interfaces 400*a* and 400*b* for conducting a search session and providing the results of a remedial search operation. The user interfaces can be implemented on a client device 102, for example.

As shown in user interface 400*a*, a user has entered the query Pennsylvania History into a query entry field 410*a*. The entered query may have been provided to a search engine (e.g., search engine 130), and the received search results are displayed in a search results display 420*a*, for example.

After submitting the query, or alternatively, after receiving the search results, search results interaction data may be collected regarding the Pennsylvania History query. The collected search results interaction data can include the particular web resources that the user viewed from the displayed search results, for example.

Thereafter, the search results interaction data analyzer 133 can determine if one or more remedial search operations should be performed. In the example shown, the search results interaction data analyzer 133 has determined that the user is not satisfied with the research results and has performed a remedial search operation to provide further information or options in the user interface 400*b*. In the example shown in user interface 400*b* the search results interaction data analyzer 133 has performed the remedial search operation of providing common keywords associated with the selected web resources as query suggestions. As shown, the query suggestions are three alternative queries including William Penn, Philadelphia and American Revolution. The common keywords displayed in the query suggestion display window 415*b* may have been determined by the search results interaction data analyzer 133 based on the web resource data associated with each of the viewed web resources stored at the web resource data store 131, for example.

Figure 5:
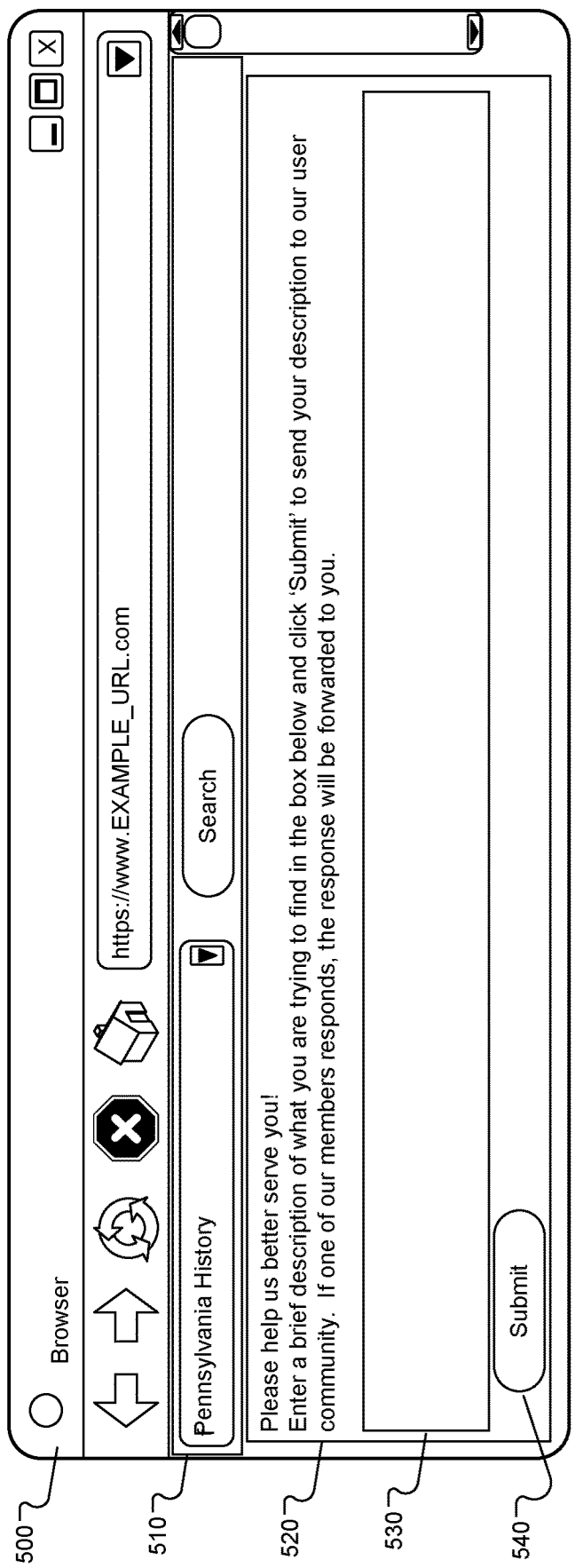
FIG. 5 is an illustration of an example user interface showing the results of a remedial search operation.

FIG. 5 is an illustration of an example user interface 500 showing the results of a remedial search operation. The user interface 500 can be implemented on a client device 102, for example.

As illustrated, a remedial search operation of asking the user to provide feedback on the submitted query is realized in the user interface 500. A user had previously entered the query Pennsylvania History in the query entry field 510. The user received a set of search results responsive to the entered query from the search engine 130. Search results interaction data was collected from the user with respect to the entered query. The collected search results interaction data was sent to the search results interaction data analyzer 133 to generate a query suggestion for the user, for example.

As illustrated in the window 520, the generated remedial search operation includes presenting a questionnaire or survey requesting additional details about the information the user is trying to locate. In the example shown, the user is asked to enter a brief description of what information they are trying to locate in the text entry box 530. After entering the text, the user may submit the text in the text entry box 530 by selecting the submit button 540, for example.

In some implementations, the submitted text may be posted on a message board or user forum related to the search engine 130. Members or users of the forum may view the post and provide feedback or suggestions to the user. Responses to the post may be provided to the user. In other implementations, the submitted text may be sent to administrators or query specialists who can help the user formulate a successful query, for example.

Figure 6:
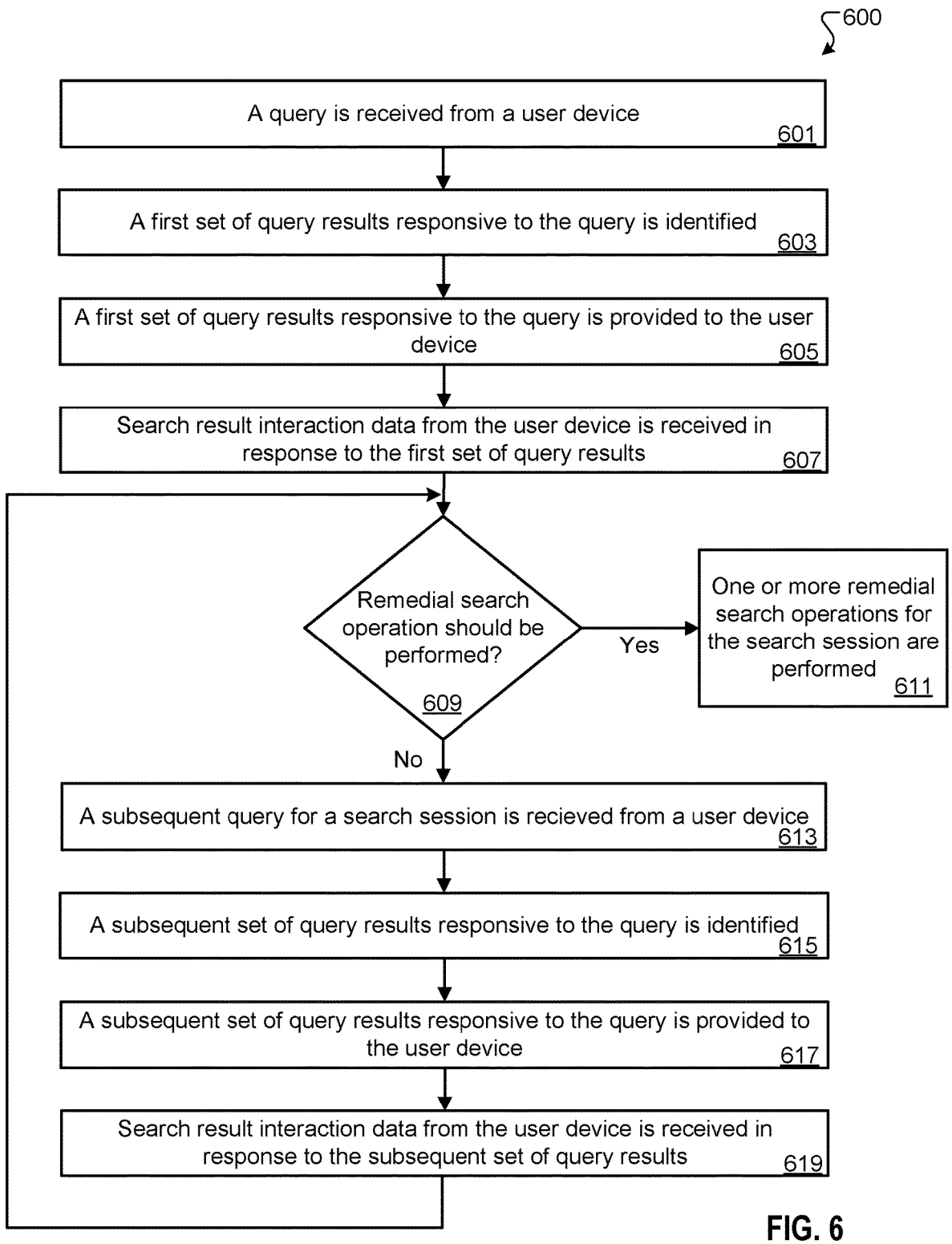
FIG. 6 is a flow diagram of an example process for which remedial search operations may be performed.

FIG. 6 is a flow diagram of an example process 600 in which remedial search operations may be performed. The process 600 can be implemented at a search engine 130, for example.

A query is received from a user device (601). The query can be received by the search engine 130 from a user device such as the client device 102, for example.

A first set of search results responsive to the query is identified (603). In some implementations, the search results are identified by the search engine 130. The search results will generally include links (e.g., URLs) identifying one or more web resources 111*a*-113*a* at the publishers 111-113. The number of search results provided in the first set of search results can be determined according to user preferences or by a default number specified by the search engine 130.

The first set of search results is provided to the user device (605). In some implementations, the search results are provided to the user device by the search engine 130 in the form of a web page.

Search results interaction data are received in response to the first set of search results (607). The search results interaction data can be received by the search results interaction data analyzer 133 of the search engine 130 from the user device, for example.

The search results interaction data can include search results interaction data such as identifiers of the web resources in the first set of search results that the user selected, whether the selections were short or long clicks, and any additional queries that the user made after receiving the first set of search results.

The search results interaction data are analyzed to determine whether one or more remedial search operations should be performed (609). In some implementations, the search result interaction data are analyzed by the search results interaction data analyzer 133 of the search engine 130. One or more remedial search operations should be performed if the analysis of the search results interaction data indicates a pre-defined pattern of user interactions that suggest that the user was not satisfied with the first set of search results. For example, search results interaction data that include an amount of additional queries greater than a threshold number of queries submitted during the search session can indicate the user is not satisfied with the search results. If no remedial search operation should be performed than the process 600 may receive a subsequent query from the user device (601).

If one or more remedial search operations should be performed, then the one or more remedial search operations are performed by the search engine 130 (611). The one or more remedial search operations can be performed by the search results interaction data analyzer 133 of the search engine 130, for example.

Thereafter, a subsequent query is received from a user device (613), a subsequent set of search results responsive to the query is identified (615), a subsequent set of search results is provided to the user device (617), and search results interaction data are received in response to the subsequent set of search results (619). The search results interaction data are then analyzed to determine whether one or more remedial search operations should be performed (609), as described above.

In some implementations, the remedial search operations include determining if any of the queries indicated by the search results interaction data have associated related queries. For example, the related query data associated with a query in the related query data store 132 can include alternative spellings, synonyms, and homonyms, associated with the query. The related query data can then be presented to the user as links that when selected will cause the associated related query to be submitted to the search engine 130, for example.

In some implementations, the remedial search operation includes determining if any of the selected web resources indicated by the search results interaction data have any common associated keywords. In some implementations, keywords associated with the web resources indicated by the search results interaction data can be determined by the search results interaction data analyzer 133 from the web resource data associated with the web resources. The common associated keywords can then be presented to the user as links that when selected will cause the keywords to be submitted to the search engine 130, for example.

In other implementations, the redial search operation can include providing a request for additional information to the user. For example, the search results interaction data analyzer 133 can generate a user interface element that requests the user to provide additional information about what the user is looking for. The user interface element can then be sent to the client device and displayed to the user. Information subsequently entered by the user into the user interface element can then be submitted to a search specialist who may attempt to help the user formulate a query based on the additional information. Alternatively or additionally, the information entered by the user can be posted to a discussion forum. Users associated with the forum can then provide suggested queries. The suggested queries can then be provided to the user.

Figure 7:
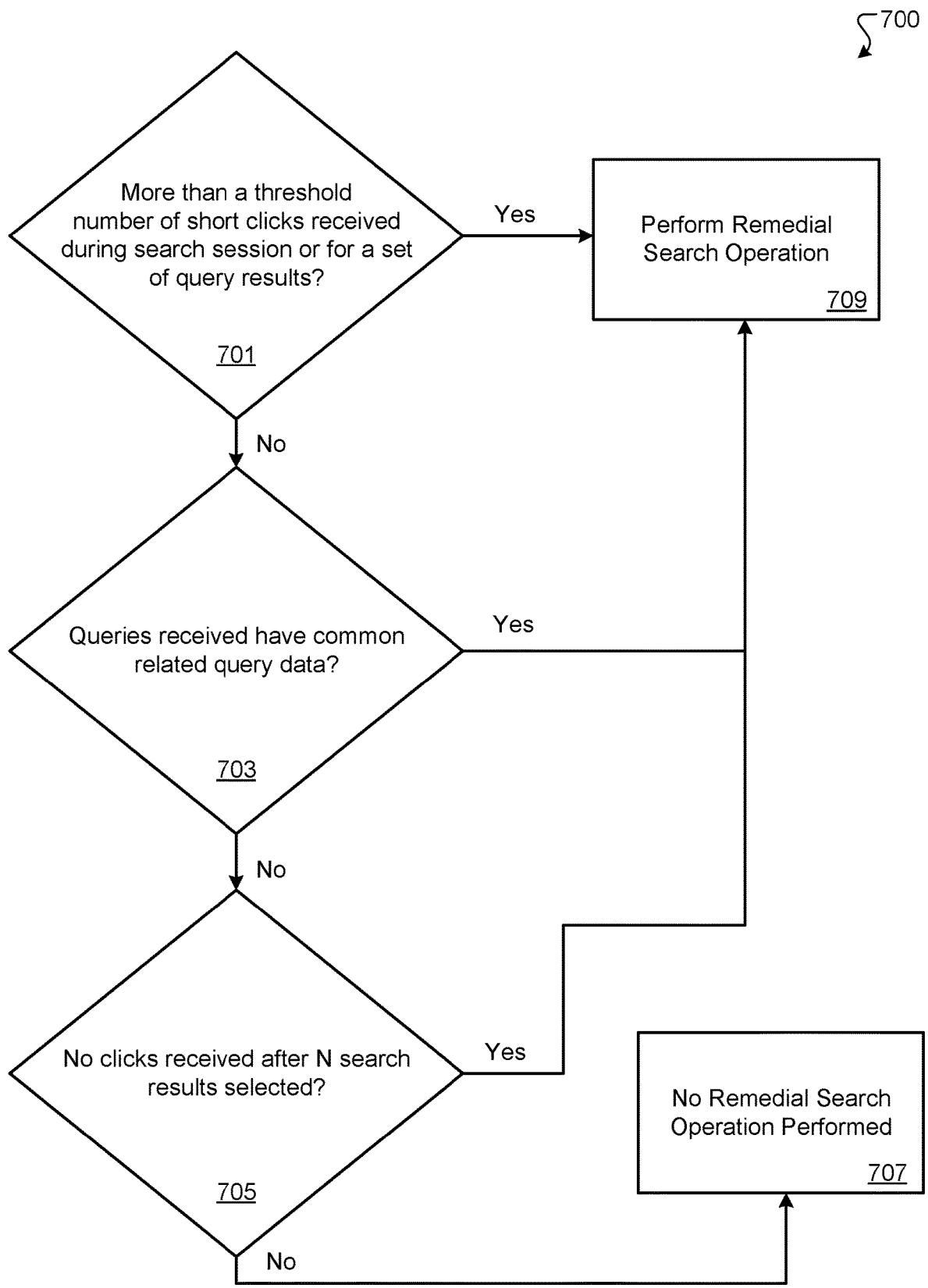
FIG. 7 is a flow diagram of an example process for determining if a remedial search operation should be performed

FIG. 7 is a flow diagram of an example process 700 for determining if a remedial search operation should be performed. The process 700 can be implemented at a search engine 130, for example.

A determination is made if more than a threshold number of short clicks are received during a search session or for a particular set of query results (701). In some implementations, the determination may be made by the search results interaction data analyzer 133 using the search results interaction data. A large number of short clicks may indicate the user was not satisfied with the majority of the search results presented and that a remedial search operation should be performed. If the number of short clicks received exceeds a threshold number of short clicks, then a remedial search operation is performed (709).

If the number of short clicks received does not exceed the threshold number of short clicks, then the process 700 determines if the received queries have common related query data (703). In some implementations, the determination may be made by the search results interaction data analyzer 133 using the search results interaction data and the related query data. The related query data for the received queries may indicate common categories or topics that are associated with the received queries. If the received queries have related query data in common, then the user may have been trying to search for the topic or category represented by the common related query data rather than the received queries, accordingly, the user may be unhappy with the search results that have been presented. If the received queries have common related query data, then a remedial search operation is performed (709).

If the received queries have no common related query data, then the process 700 determines if no clicks have been received after the first N selected search results (705). In some implementations, the determination may be made by the search results interaction data analyzer 133 using the search results interaction data. For example, a user may make short clicks on two links in the search results and make no further selections to the search results. This may indicate that the user is not satisfied with the first two selected search results, and thus will likely not be satisfied with the remaining search results. Accordingly, a remedial search operation may be performed.

The particular value chosen for N may be determined by an administrator, and may depend on a variety of factors, including the number of search results presented and the search history of the user, for example. If no clicks have been made to search results after the first N selected search results, then the process 700 may determine that a remedial search operation should be performed (709). Otherwise no remedial search operation is performed (707).

A remedial search operation is performed (709). The remedial search operation may be performed by the search engine 130, for example. The remedial search operations may include one or more of the following remedial search operations: keywords or related query data associated with one or more of the submitted queries may be displayed as query suggestions; the number of search results presented may be increased; the search preferences associated with a user may be adjusted; and the queries may be submitted to a search specialist for further review. Other remedial search operations may also be performed.

Figure 8:
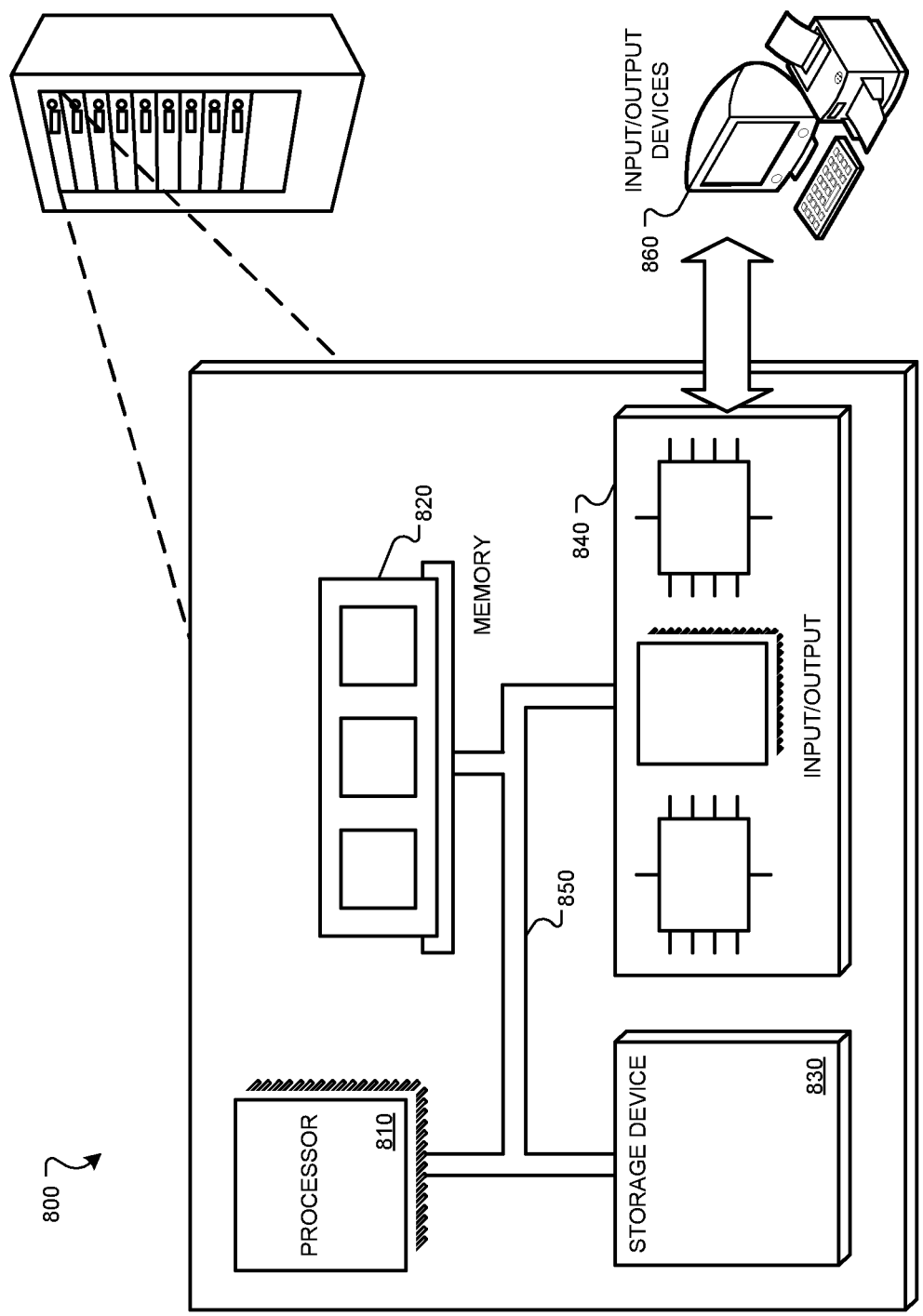
FIG. 8 is a block diagram of an example computer system that can be used to implement the systems and methods described herein.

FIG. 8 is a block diagram of an example computer system 800 that can be utilized to implement the systems and methods described herein. For example, search engine 130 may be implemented using the system 800.

The system 800 includes a processor 810, a memory 820, a storage device 830, and an input/output device 840. Each of the components 810, 820, 830, and 840 can, for example, be interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can, for example, include a hard disk device, an optical disk device, or some other large capacity storage device.

The input/output device 840 provides input/output operations for the system 700. In one implementation, the input/output device 840 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 860.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a random or serial access memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   determining, by a data processing apparatus, that a user device submitted one or more search queries during a search session;
   determining, by the data processing apparatus and based on user interaction with one or more search results of a first number of search results presented at the user device during the search session, that a user dissatisfaction condition has occurred;
   in response to determining that the user dissatisfaction condition has occurred:
      identifying, by the data processing apparatus, a set of two or more resources that were requested by the user device for presentation in response to user interactions with search results of the first number of search results during the search session;
      identifying, by the data processing apparatus, a common keyword that is (i) presented by at least two of the two or more resources requested by the user device for presentation through user interactions with the search results of the first number of search results during the search session and (ii) determined to be related to the one or more search queries submitted during the search session; and
      performing, by the data processing apparatus, a remedial search operation that includes providing, to the user device and for presentation on a search results page, a link that, when selected, initiates a search using the identified common keyword, wherein a second number of search results presented in response to the selection of the link to initiate the search using the identified common keyword is greater than the first number of search results.

2. The method of claim 1, wherein identifying the common keyword that is presented by at least two of the two or more resources, comprises identifying a keyword that is included in a title of each of the two or more resources.

3. The method of claim 1, wherein identifying the common keyword that is presented by at least two of the two or more resources, comprises identifying a keyword that is included in metadata for each of the two or more resources.

4. The method of claim 1, wherein determining that the user dissatisfaction condition has occurred comprises determining that the user device requested fewer than a specified number of resources referenced by search results provided to the user device in response to the one or more search queries.

5. The method of claim 1, wherein determining that the user dissatisfaction condition has occurred comprises:
   determining that the user device requested presentation of two or more pages of search results in response to one of the one or more search queries; and
   determining that no user interaction occurred with the search results presented on the two or more pages of search results.

6. The method of claim 1, wherein determining that the user dissatisfaction condition has occurred comprises:
   identifying a number of search queries submitted by the user device after presentation of a first search results page during the search session; and
   determining that the number of search queries meets a threshold number of search queries.

7. A system comprising:
   one or more computers; and
   a data store storing instructions executable by the one or more computers that upon such execution cause the one or more computers to perform operations comprising:
      determining that a user device submitted one or more search queries during a search session;
      determining, based on user interaction with one or more search results of a first number of search results presented at the user device during the search session, that a user dissatisfaction condition has occurred;
      in response to determining that the user dissatisfaction condition has occurred:
         identifying a set of two or more resources that were requested by the user device for presentation in response to user interactions with search results of the first number of search results during the search session;
         identifying a common keyword that is (i) presented by at least two of the two or more resources requested by the user device for presentation through user interactions with the search results of the first number of search results during the search session, and (ii) determined to be related to the one or more search queries submitted during the search session; and
         performing a remedial search operation that includes providing, to the user device and for presentation on a search results page, a link that, when selected, initiates a search using the identified common keyword, wherein a second number of search results presented in response to the selection of the link to initiate the search using the identified common keyword is greater than the first number of search results.

8. The system of claim 7, wherein identifying the common keyword that is presented by at least two of the two or more resources, comprises identifying a keyword that is included in a title of each of the two or more resources.

9. The system of claim 7, wherein identifying the common keyword that is presented by at least two of the two or more resources, comprises identifying a keyword that is included in metadata for each of the two or more resources.

10. The system of claim 7, wherein determining that the user dissatisfaction condition has occurred comprises determining that the user device requested fewer than a specified number of resources referenced by search results provided to the user device in response to the one or more search queries.

11. The system of claim 7, wherein determining that the user dissatisfaction condition has occurred comprises:
determining that the user device requested presentation of two or more pages of search results in response to one of the one or more search queries; and
determining that no user interaction occurred with the search results presented on the two or more pages of search results.

12. The system of claim 7, wherein determining that the user dissatisfaction condition has occurred comprises:
identifying a number of search queries submitted by the user device after presentation of a first search results page during the search session; and
determining that the number of search queries meets a threshold number of search queries.

13. A non-transitory computer storage medium encoded with a computer program, the program comprising instructions that when executed by one or more data processing apparatus cause the one or more data processing apparatus to perform operations comprising:
determining that a user device submitted one or more search queries during a search session;
determining, based on user interaction with one or more search results of a first number of search results presented at the user device during the search session, that a user dissatisfaction condition has occurred;
in response to determining that the user dissatisfaction condition has occurred:
identifying a set of two or more resources that were requested by the user device for presentation through user interactions with search results of the first number of search results during the search session;
identifying a common keyword that is (i) presented by at least two of the two or more resources requested by the user device for presentation in response to user interactions with the search results of the first number of search results during the search session, and (ii) determined to be related to the one or more search queries submitted during the search session; and
performing a remedial search operation that includes providing, to the user device and for presentation on a search results page, a link that, when selected, initiates a search using the identified common keyword, wherein a second number of search results presented in response to the selection of the link to initiate the search using the identified common keyword is greater than the first number of search results.

14. The non-transitory computer storage medium of claim 13, wherein identifying the common keyword that is presented by at least two of the two or more resources, comprises identifying a keyword that is included in a title of each of the two or more resources.

15. The non-transitory computer storage medium of claim 13, wherein identifying the common keyword that is presented by at least two of the two or more resources, comprises identifying a keyword that is included in metadata for each of the two or more resources.

16. The non-transitory computer storage medium of claim 13, wherein determining that the user dissatisfaction condition has occurred comprises determining that the user device requested fewer than a specified number of resources referenced by search results provided to the user device in response to the one or more search queries.

17. The non-transitory computer storage medium of claim 13, wherein determining that the user dissatisfaction condition has occurred comprises:
determining that the user device requested presentation of two or more pages of search results in response to one of the one or more search queries; and
determining that no user interaction occurred with the search results presented on the two or more pages of search results.

* * * * *